United States Patent [19]
Uloth

[11] Patent Number: 6,007,144
[45] Date of Patent: Dec. 28, 1999

[54] GAP COVERING MEMBER FOR DIFFERENT TYPES OF PICKUP TRUCKS

[76] Inventor: Mark Uloth, Rt. 1, Box 552, Walnut Springs, Tex. 76690

[21] Appl. No.: 09/347,084

[22] Filed: Jul. 2, 1999

Related U.S. Application Data

[63] Continuation-in-part of application No. 09/212,005, Dec. 15, 1998.
[51] Int. Cl.$^6$ ...................................................... B60R 27/00
[52] U.S. Cl. ........................................... 296/198; 280/848
[58] Field of Search ......................... 296/198; 280/153.5, 280/847, 848, 851

[56] References Cited

U.S. PATENT DOCUMENTS 2,416,798  3/1947  Ferguson .
2,483,622  10/1949  Burski .

*Primary Examiner*—Gary C. Hoge
*Attorney, Agent, or Firm*—Arthur F Zobal

[57] ABSTRACT

Rectangular shaped members are provided for covering the gaps formed at the rear of a pickup truck and as seen in the rear wheel wells between the frame and side walls of the rear bed. Each of the rectangular shaped members has two elongated edges and two shorter edges with apertures formed therethrough near one of the elongated edges for receiving fastening means for attaching the rectangular shaped members to the side wall of the wheel well or to the frame on each of the sides of the pickup truck for covering the gap.

4 Claims, 7 Drawing Sheets

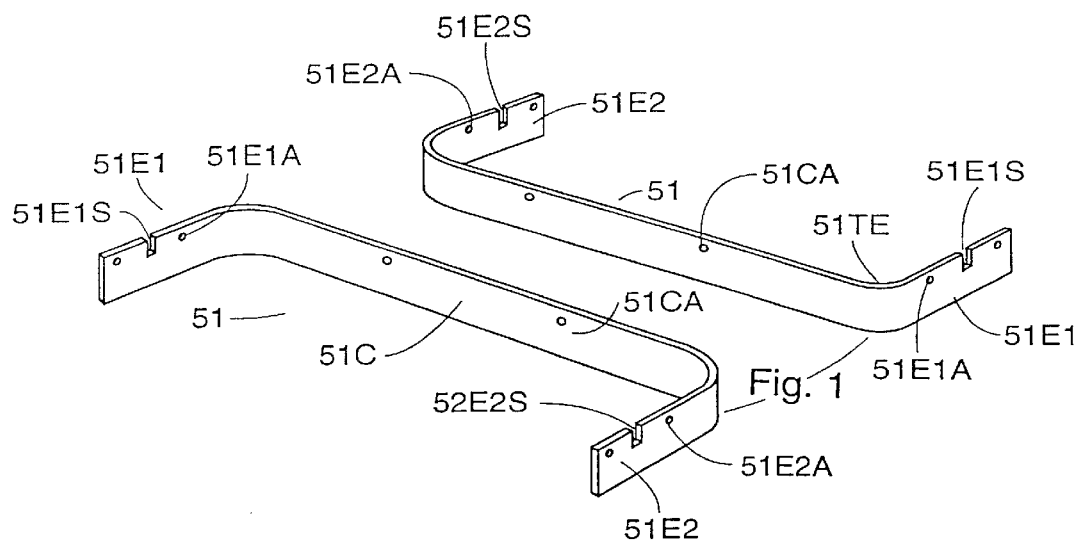
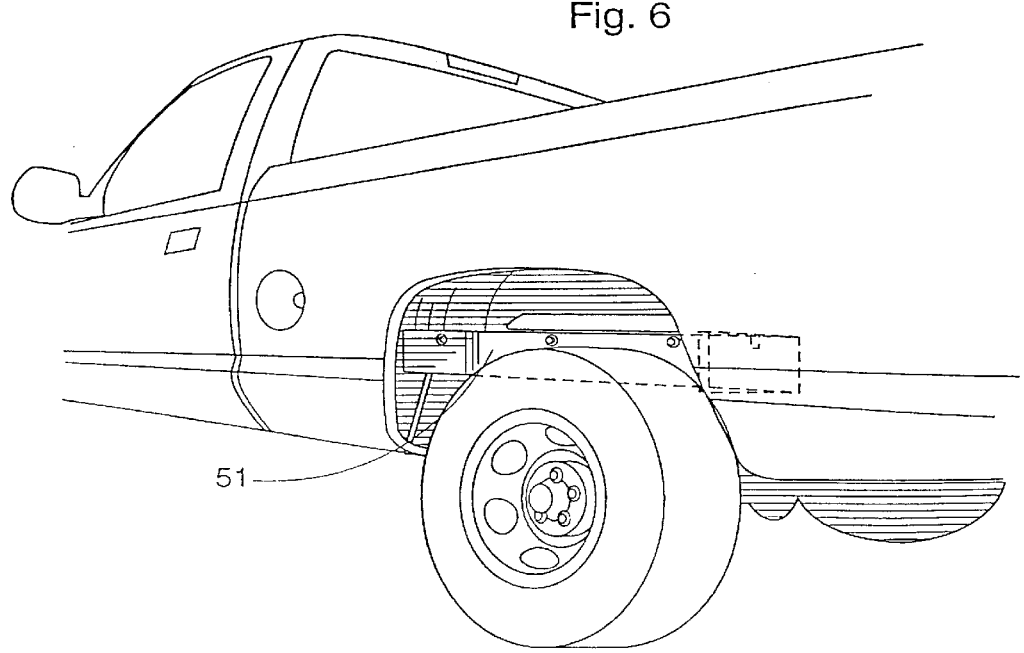

GAP COVERING MEMBER FOR DIFFERENT TYPES OF PICKUP TRUCKS

SPECIFICATION

This application is a continuation-in-part of U.S. patent application Ser. No. 09/212,005, filed Dec. 15, 1998.

BACKGROUND OF THE INVENTION

1. Field of the Invention

The invention relates to members for covering gaps found at the rear of certain pickup trucks.

2. Description of the Prior Art

CHEVROLET and GMC from 1988 to the present (including newly redesigned 1999 models) produced ½ and ¾ ton wide bed, short and long wheel base, pickup trucks that have gaps between the rear frame and the lower end of the rear bed which are visible by way of the rear wheel wells. Other CHEVROLET and GMC pickup trucks and also certain DODGE and FORD pickup trucks have gaps between the rear frame and the lower end of the rear bed which are visible by way of the rear wheel wells. Although the gaps do not cause any problems, the looks of the pickup trucks can be improved if these gaps are not visible.

SUMMARY OF THE INVENTION

It is an object of the invention to provide new and useful cover members for covering the gaps formed between the rear frame and bed of a pickup.

The cover members each comprises a rectangular shaped member having apertures formed therethrough near one of its elongated edges for receiving attachment means for attachment to the side wall of the wheel well or to the frame.

BRIEF DESCRIPTION OF THE DRAWINGS

FIG. 1 is an isometric view of a pair of gap cover members.

FIGS. 5 and 6 are views similar to that of FIG. 4 with a cover member installed.

DESCRIPTION OF THE PREFERRED EMBODIMENTS

Figure 2:
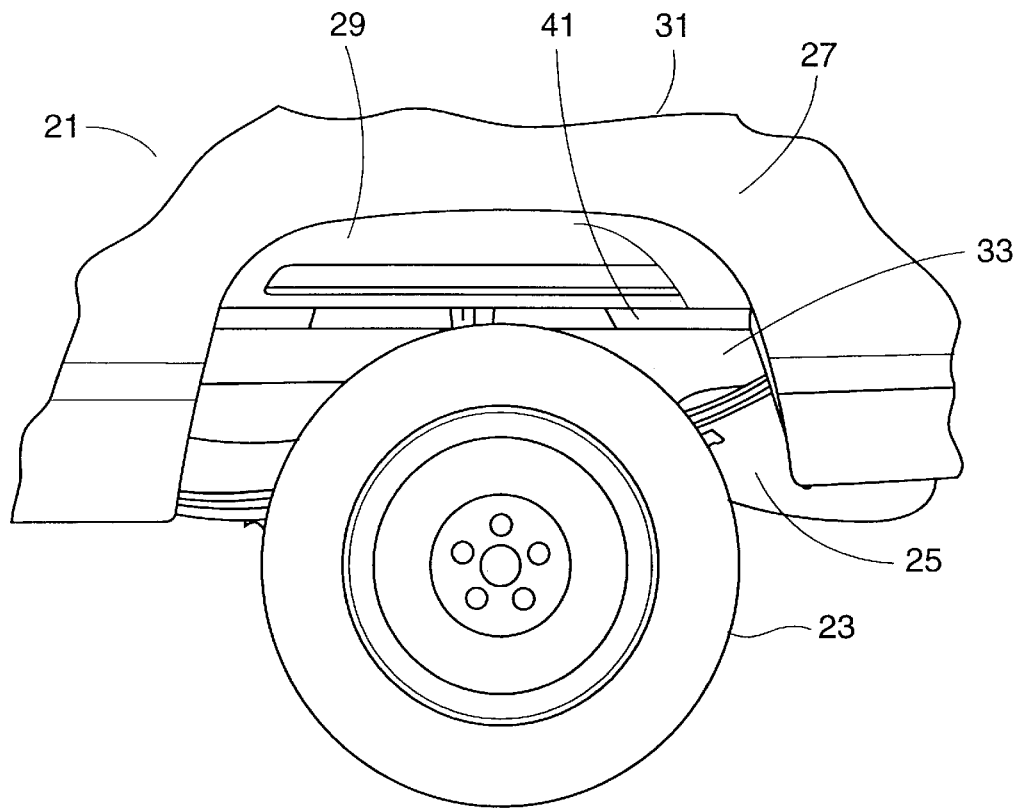
FIG. 2 is a side view of a rear wheel and wheel well of a pickup truck illustrating a gap formed between the rear frame and the bed or the side wall of the wheel well.
Figure 3:
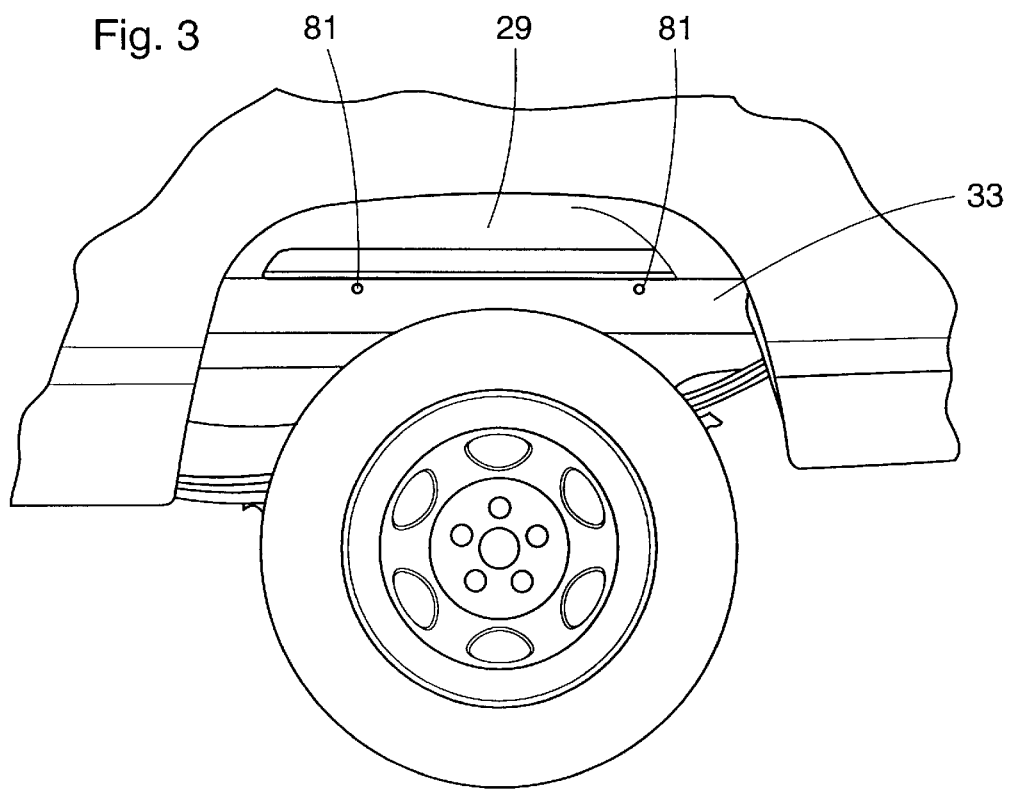
FIG. 3 is a view of a rear wheel and wheel well of a pickup truck similar to that of FIG. 2 showing one the of cover members of FIG. 1 installed.

Referring now to FIGS. 2–7 of the drawings, there is illustrated the rear side view of a pickup truck 21 having a wheel 23 supported in a wheel well 25 or inner fender extension below the fender 27. The wheel well is formed by the lower side wall 29 of the bed 31, rear frame 33 of the pickup truck, a front wall 35 and a rear wall 37. The wheel and wheel well on the opposite side of the pickup truck is a mirror image of FIG. 3 such that a gap 41 is formed between the side wall 29 and the frame 33 which is visible from both sides such that a person on one side of the pickup truck can see through the gap 41.

Referring also to FIG. 1 there is provided two identical metal cover members 51 for covering the gaps 41 on the left and right sides of a pickup truck. Either cover member 51 can be used on either side of the pickup truck. Each cover member 51 is U-shaped and comprises a flattened central portion 51C and two flattened end portions 51E1 and 51E2 extending transversely from the central portion 51C. The cover member 51 has apertures 51CA, 51E1A and 51E2A formed through the portions 51C, 51E1 and 51E2 near the top edges 51TE thereof and slots 51E1S and 51E2S extending from the top edges of end portions 51E1 and 51E2 respectively.

Figure 4:
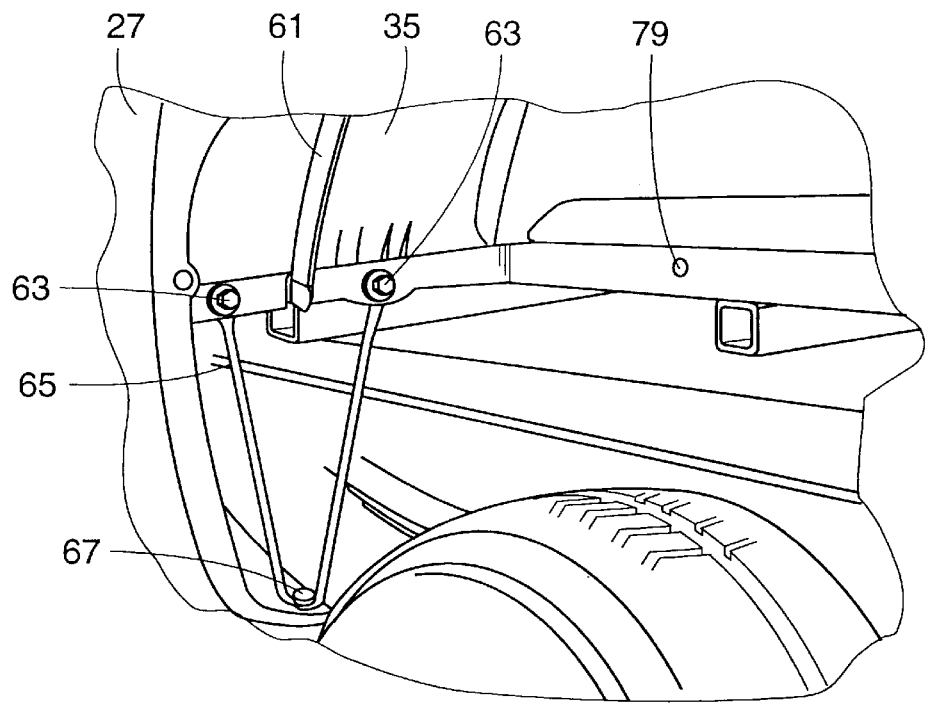
FIG. 4 is a view of the wheel and wheel wall of FIG. 2 as seen from the rear looking forward before a cover member is installed.
Figure 5:
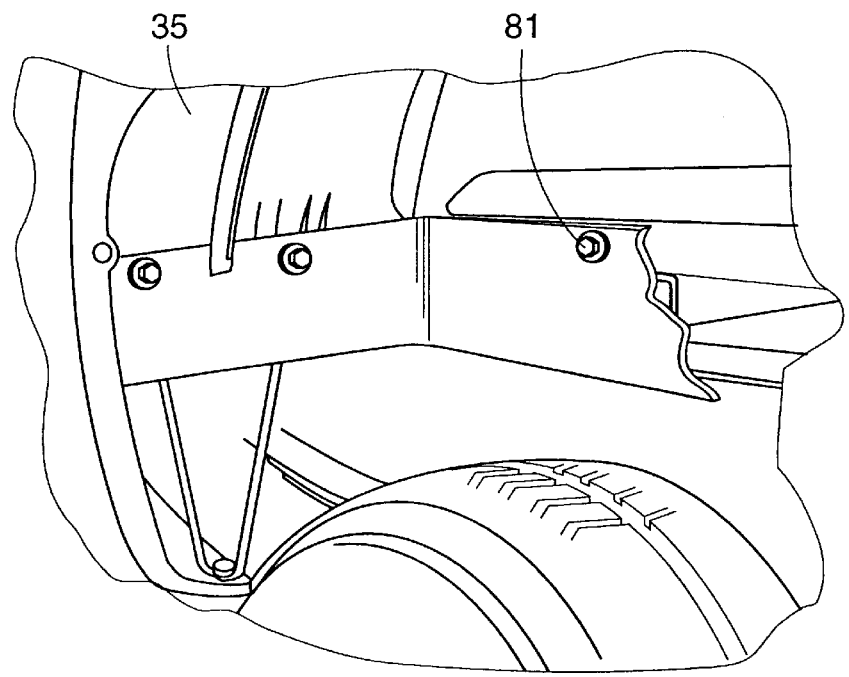
Figure 7:
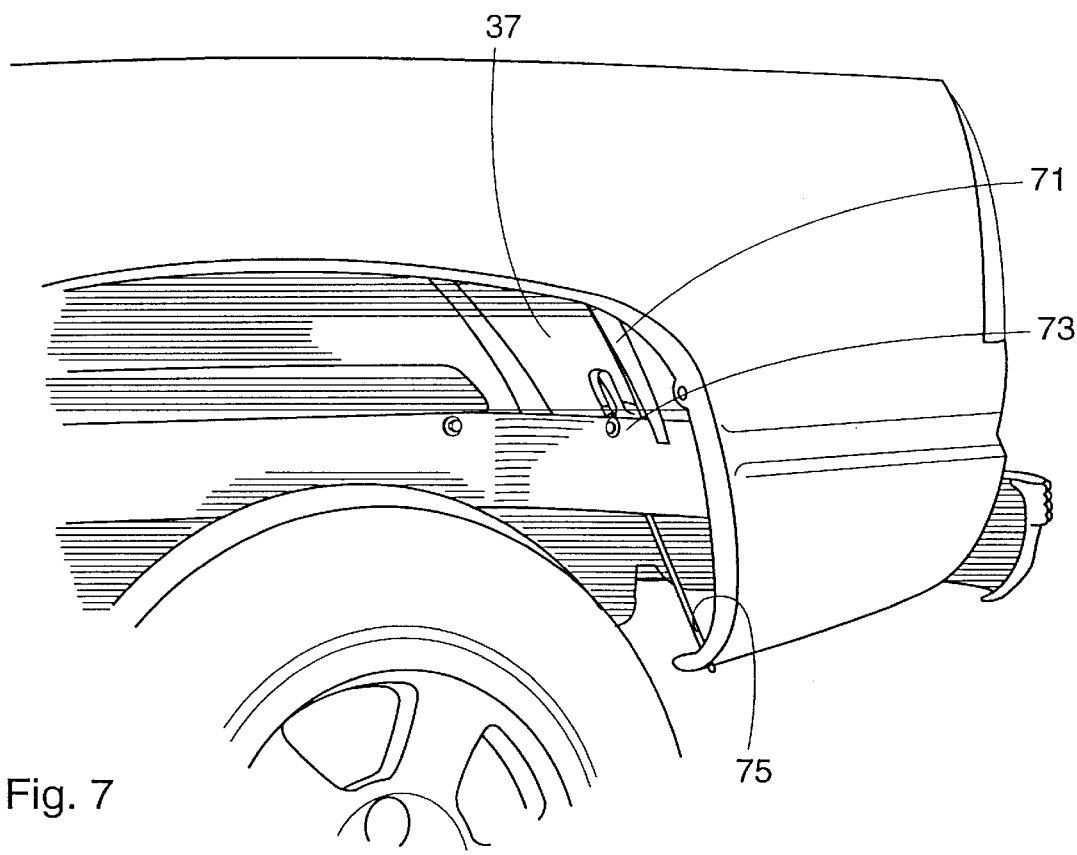
FIG. 7 is a view of the wheel and wheel well of FIGS. 2–6 looking rearward with a cover member installed.

Referring to FIGS. 4 and 6, the front wall 35 of the left rear wheel well has a stiffening ridge 61 and two apertures (not shown) for receiving two bolts 63 for attaching the upper ends of a V-shaped support 65 to the wall. The lower end of the support 65 is attached to the lower inner edge of the fender 27 by a bolt 67. Referring to FIG. 7, the rear wall 37 of the left wheel well has a stiffening ridge 71 and a single aperture (not shown) for receiving a bolt 73 for attaching the upper end of a support rod 75 to the wall. The lower end of the support rod 75 is attached to the lower inner edge of the fender 27 by a bolt 77. The right rear wheel well is constructed in a manner similar to that of the left rear wheel well.

A cover member 51 is attached to cover the gap 41 in the left rear wheel well by forming two holes (one of which is shown at 79 in FIG. 4) through the side wall 29 and removing the bolts 63 and 73. The cover member 51 then is attached in place by fitting the ridges 61 and 71 in the slot 51E1S and 51E2S of cover member portions 51E1 and 51E2. The bolts 63 are inserted through the apertures 51E1A, through the apertures formed through the upper ends of the V-shaped member 65 and screwed into the wall 35. The bolts 73 are inserted through the inner aperture 51E2A of the cover member portion 51E2, through the aperture formed through the upper end of the rod 75 and screwed into the wall 37. Bolts 81 are inserted through apertures 51CA of the cover member portion 51C and screwed into the aperture 79. The bolts 81 may be self-tapping such that it is not necessary to preform the apertures 79.

The other cover member 51 is turned around as shown in FIG. 1 and attached to the walls forming the rear right wheel well in a similar manner to cover the gap on the other side of the pickup truck.

In one embodiment, each of the cover members of FIG. 1 may have a central portion 51C with a length of 35 inches, end portions 51E1 and 51E2 each with a length of 12 ½ inches. The height of each of the cover members may be 3 inches.

Figure 10:
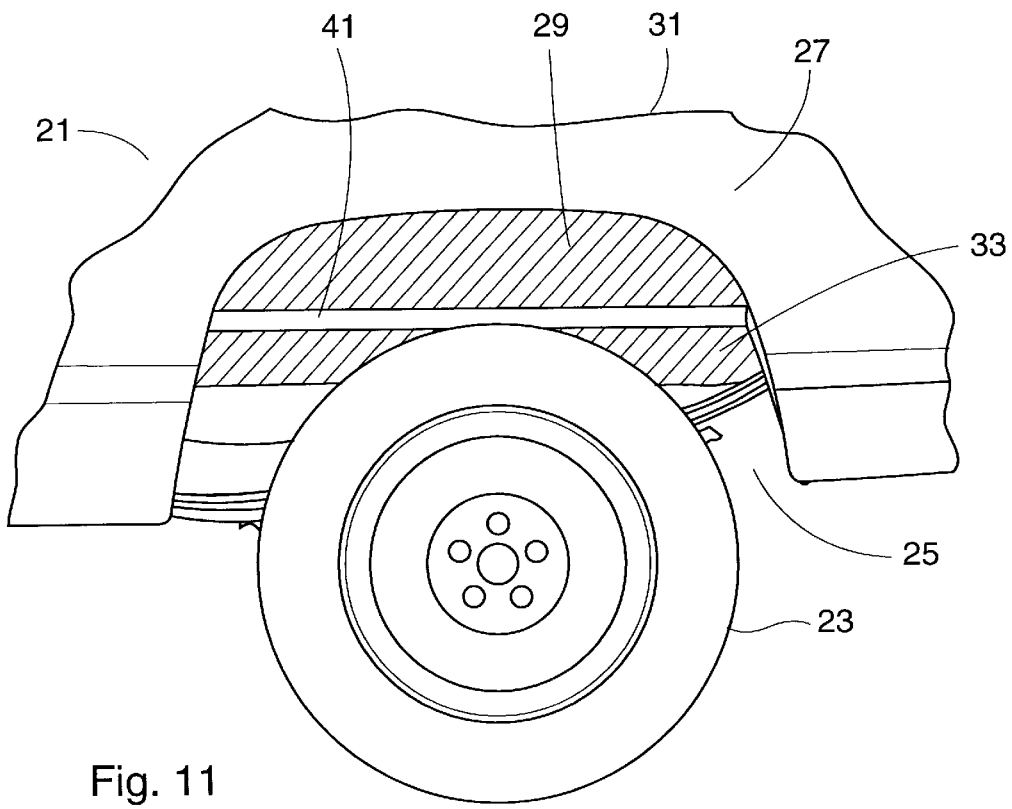
FIG. 10 is a side view of a rear wheel and wheel well of a pickup truck illustrating a gap formed between the rear frame and the bed or the side wall of the wheel well.
Figure 11:
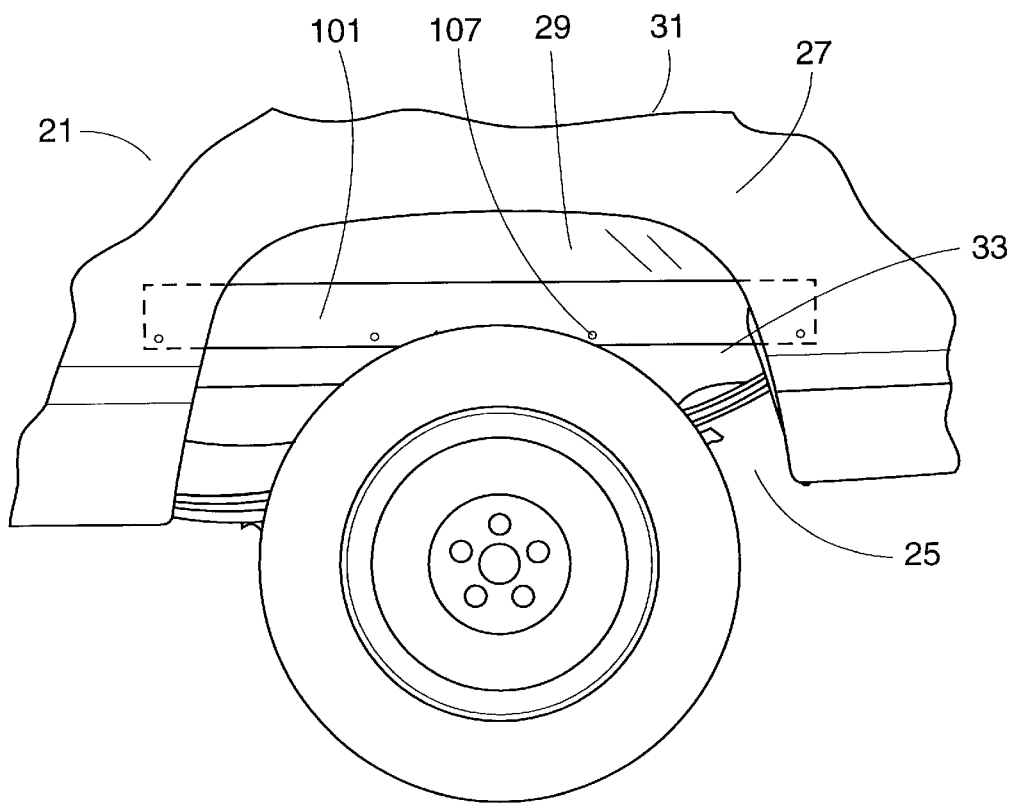
FIG. 11 is a side view of a rear wheel and wheel well of a pickup truck similar to that of FIG. 10 showing one of the cover members of FIG. 8 installed.
Figure 12:
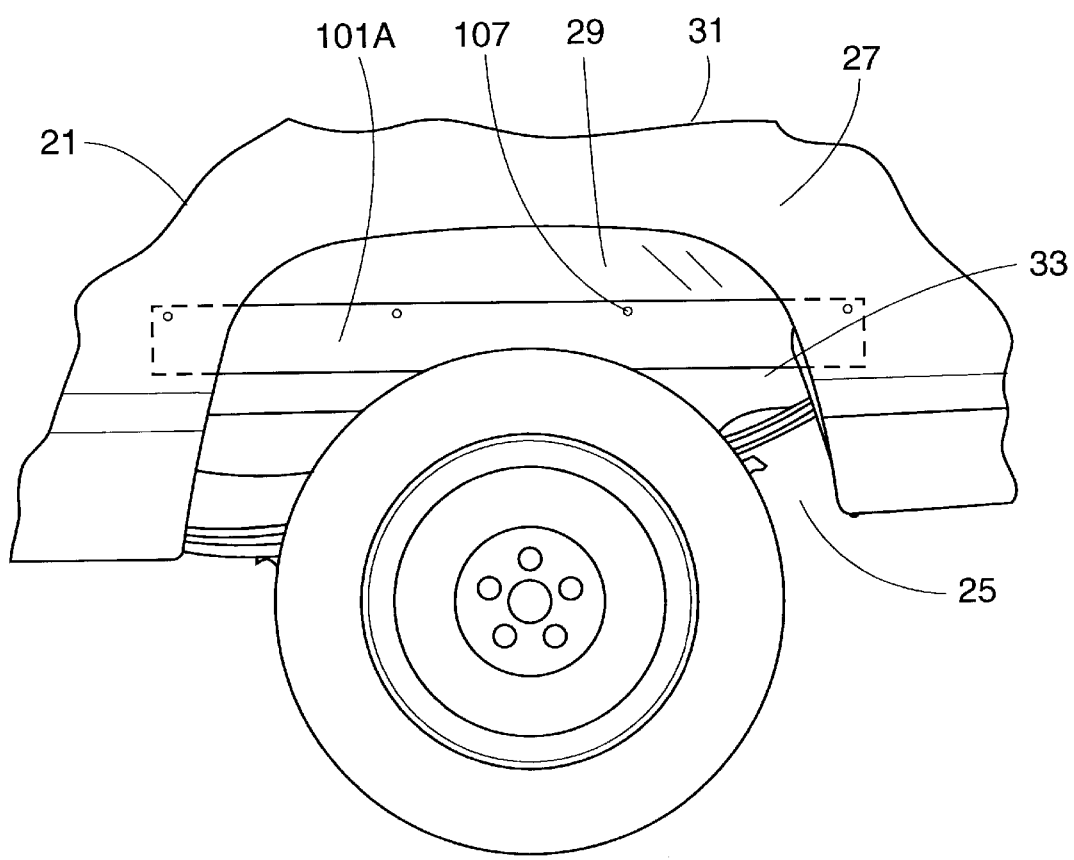
FIG. 12 is a side view of a rear wheel and wheel well of a pickup truck similar to FIG. 10 showing one of the cover members of FIG. 9 installed.

In FIGS. 10 and 11, there is illustrated the rear side of a pickup truck 21 having a wheel 23 supported in a wheel well 25 or inner fender extension below the fender 27. The wheel well is formed by the lower side wall 29 of the bed 31, and the rear frame 33 of the pickup truck. The rear wheel and wheel well on the opposite side of the pickup truck is a mirror image of FIG. 10 such that a gap 41 is formed between the side wall 29 and the frame 33 which is visible from both sides such that a person on one side of the pickup truck can see through the gap 41.

Figure 8:
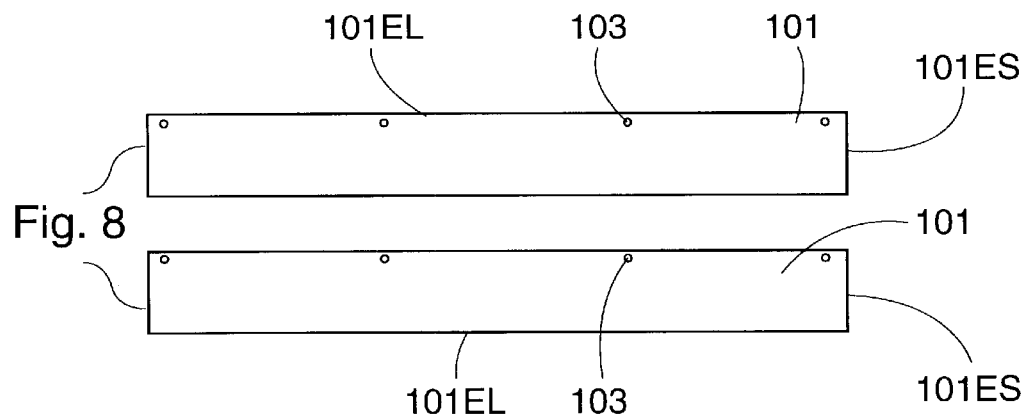
FIG. 8 is a plan view of a pair of cover members of the invention.

Referring also to FIG. 8, there is provided two identical cover members 101 for covering the gaps 41 on the left and right sides of the pickup truck. Either cover member 101 can be used on either side of the pickup truck. Each cover member 101 is a flat rectangular shaped member having two elongated edges 101EL and two shorter edges 101ES with apertures 103 formed through the member 101 near one of the elongated edges 101EL.

A cover member 101 is attached to cover the gap 41 in the left rear wheel well by inverting the covers 101 and using four self-tapping bolts 107 to attach the cover to the frame 33 of the pickup truck which may be a CHEVROLET S-10, a GMC S-15, or SONOMA. The self-tapping bolts 107 are inserted through the apertures 103 and screwed into the frame 33 to attach the cover 101 to the frame 33 to cover the gap 41 on one side of the pickup truck. The other cover member 101 is attached to the frame 33 in a similar manner to cover the gap 41 on the other side of the pickup truck.

Figure 9:
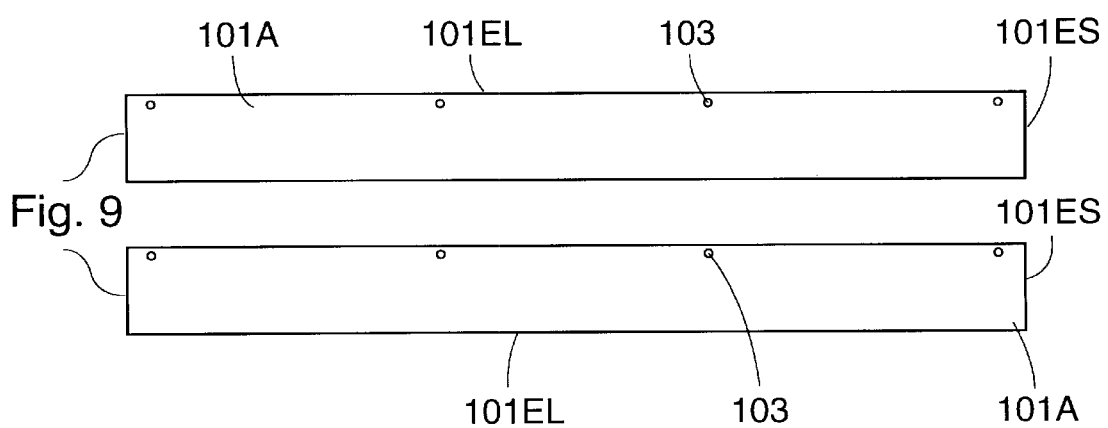
FIG. 9 is a plan view of a pair of longer cover members of the invention.

The cover members 101A of FIG. 9 are the same as those of FIG. 8 except they are longer. Either of the members of FIGS. 8 or 9 may be attached to the side walls 29 of the wheel wells of the pickup trucks listed below except for the CHEVROLET S-10, GMC S-15 or SONOMA. The self-tapping bolts 107 are inserted through the apertures 103 of the covers 101A and screwed into the side walls 29 for attaching each of the covers 101A to the side walls 29 and to attach the covers 101A to the side walls 29 on opposite sides of the pickup truck to cover the gap 41.

In one embodiment, the cover members of FIGS. 8 and 9 may be formed of metal having a thickness of about 1/16 of an inch and a width of about 3 inches. The length of each of the cover member 101 of FIG. 8 may be about 31.5 inches and the length of each of the cover members 101A of FIG. 9 may be about 43 inches. It is to be understood that the dimensions of the cover members may have minor variances.

The cover members 101 of FIG. 8 may be used on the following pickup trucks to cover their gaps 41: CHEVROLET S-10, 1982 and later; DODGE DAKOTA, 1986 and later; DODGE, 1994 and later, fill size, 1500, 2500, 3500 except 4×4; FORD RANGER, 1993 and later; FORD F-150, 1987 and later, narrow bed, 1997 and later, wide bed; GMC S-15, 1982–1993; GMC SONOMA 1994 and later.

The cover members 101A of FIG. 9 may be used on the following pickup trucks to cover their gaps 41: CHEVROLET full size 1500, 1988–1998 narrow bed; FORD F-150 1987–1996 wide bed; FORD F-250, 350 1987 and later; and GMC 1500 1988–1998 narrow bed.

It is to be understood that the cover members 101 of FIG. 8 also may be used to cover the gaps on the pickup trucks described above to which the U-shaped cover of FIG. 1 were attached.

I claim:

1. A cover member for covering a gap formed between the rear frame and truck bed of a pickup truck in line with the rear wheel wells, each of which is of the type having a side wall above said gap, comprising:

a rectangular shaped member having two elongated edges and two shorter edges with apertures formed therethrough near one of said elongated edges for receiving fastening means for attaching said rectangular shaped member to said frame for covering the gap.

2. A cover member for covering a gap formed between the rear frame and truck bed of a pickup truck in line with the rear wheel wells, each of which is of the type having a side wall above said gap, comprising:

a rectangular shaped member having two elongated edges and two shorter edges with apertures formed therethrough near one of said elongated edges for receiving fastening means for attaching said rectangular shaped member to said side wall for covering the gap.

3. A pickup truck comprising:

a rear frame for supporting a truck bed and a rear wheel located in a rear wheel well on each side of said truck with each rear wheel well comprising a side wall, each of said side walls being located above said frame on each side of said pickup truck such that a gap is formed between said rear frame and said side walls, a rectangular shaped member attached to said pickup truck on each side thereof for covering said gap, each of said rectangular shaped members having two elongated edges and two shorter edges with apertures formed therethrough near one of said elongated edges for receiving fastening means for attaching said rectangular shaped members to said frame on each of said sides of said pickup truck for covering said gap.

4. A pickup truck comprising:

a rear frame for supporting a truck bed and a rear wheel located in a rear wheel well on each side of said truck with each rear wheel well comprising a side wall, each of said side walls being located above said frame on each side of said pickup truck such that a gap is formed between said rear frame and said side walls, a rectangular shaped member attached to said pickup truck on each side thereof for covering said gap, each of said rectangular shaped members having two elongated edges and two shorter edges with apertures formed therethrough near one of said elongated edges for receiving fastening means for attaching said rectangular shaped members to said side walls on each of said sides of said pickup truck for covering said gap.

* * * * *